United States Patent [19]

Tanigawa et al.

[11] Patent Number: 4,755,833

[45] Date of Patent: Jul. 5, 1988

[54] THERMAL TRANSFER PRINTER

[75] Inventors: Naohide Tanigawa, Hirakata; Hiroshi Tomita, Kyoto; Michio Kunimitsu, Yawata; Hiroichi Yoneda, Kyoto; Hirokazu Genno, Hirakata, all of Japan

[73] Assignee: Sanyo Electric Co., Ltd., Osaka, Japan

[21] Appl. No.: 929,806

[22] Filed: Nov. 13, 1986

[30] Foreign Application Priority Data

| | | | |
|---|---|---|---|
| Nov. 20, 1985 | [JP] | Japan | 60-178418[U] |
| Jan. 10, 1986 | [JP] | Japan | 61-2222[U] |
| May 9, 1986 | [JP] | Japan | 61-70492[U] |
| May 9, 1986 | [JP] | Japan | 61-70494[U] |

[51] Int. Cl.[4] ..... G01D 15/10

[52] U.S. Cl. ..... 346/76 PH; 400/120; 219/216

[58] Field of Search ..... 346/76 PH, 76 R; 219/216 PH; 400/126, 120, 617, 618, 902; 355/14 SH

[56] References Cited

U.S. PATENT DOCUMENTS

| | | | |
|---|---|---|---|
| 4,562,443 | 12/1985 | Matsuno et al. | 346/76 PH |
| 4,563,690 | 1/1986 | Tomita et al. | 346/76 PH |
| 4,651,167 | 3/1987 | Moriguchi et al. | 400/120 |
| 4,660,053 | 4/1987 | Tsutsumi et al. | 346/76 PH |

FOREIGN PATENT DOCUMENTS 58-140266 8/1983 Japan .

*Primary Examiner*—E. A. Goldberg
*Assistant Examiner*—H. Tran
*Attorney, Agent, or Firm*—Wenderoth, Lind & Ponack

[57] ABSTRACT

The thermal transfer printer of the present invention prevents slackening of recording paper by exerting a braking force upon a recording paper roll to give a back tension to the recording paper when one of the colors of an ink sheet coated with inks of a plurality of colors is thermal-transfer-printed. The recording paper is unwound from the roll thereof in the forward direction and by rotating the recording paper roll in the backward direction the recording paper is rewound. A roller for carrying the recording paper is stopped or braked at the downstream side of the platen when the recording paper is carried in the backward direction for the thermal transfer printing by the next color.

15 Claims, 6 Drawing Sheets

THERMAL TRANSFER PRINTER

BACKGROUND OF THE INVENTION

1. Field of the Invention

This invention relates to a thermal transfer printer for color printing and, in particular, to a thermal transfer printer for color printing on recording paper by using an ink sheet having ink including three primary colors or four colors, one of which is black, in addition to the three primary colors.

2. Description of the Prior Art

A thermal transfer printer used as an output printer in computer systems, word-processors, and the like is capable of color printing relatively easily by applying ink including several colors several times to the same page of the same printing medium. Thus, this printer is suitable for outputting data displayed as the so-called computer graphics or as color images.

A thermal transfer printer capable of color printing as described above has been disclosed in, for example, the Japanese Patent Laid-open No. 58-140266 (1983).

In the thermal transfer printer of the kind referred to above, generally, an ink sheet having ink having four colors including three primary colors (yellow, magenta, and cyan) and black sequentially disposed thereon and a recording paper are put one upon another and are carried to a contact part between a thermal transfer head and a platen so that all colors of ink are thermally transferred to the recording paper in succession. After every time printing in one color is completed, the recording paper is carried backward and then printing in the succeeding color of the same page as that previously printed is performed, and the repeat of such a process results in color printing.

However, in the above-described conventional thermal transfer printer, a roll paper is usually used as the recording paper. But, since a reel for holding such a roll-shaped printing paper is freely rotatable within the printer, when the recording paper is carried in the backward direction, the roll of the recording paper is not rotated, whereby the recording paper sags. Strictly speaking, the recording paper begins to sag from the time when the recording paper begins to be carried in the backward direction and the sag of the recording paper is removed when the carrying of the recording paper in the forward direction for the thermal transfer printing by the ink of the next color is completed. In addition, the sag of the recording paper is at a maximum within a period of time from when the carrying of the recording paper in the backward direction is completed until the carrying of the recording paper in the forward direction is started, i.e., a period for awaiting the thermal transfer printing by the ink of the next color.

Accordingly, in the conventional thermal transfer printer, a space for accommodating the sagged portion of the recording paper produced during the carrying of the recording paper in the backward direction is required, whereby the printer as a whole is relatively large. Also, there is the possibility that the sagged recording paper can become caught on members within the printer to disturb the normal carrying of the recording paper. In addition, since the sagged recording paper is not controlled at all in carrying directions thereof (the forward direction or the backward direction), there is a great possibility that the recording paper will move obliquely when it is carried in the forward direction to carry out the thermal transfer printing.

Besides, there is the possibility that upon applying a great force to the recording paper when it is carried in the forward direction, the roll of the recording paper with the recording paper wound therearound will rotate excessively more than necessary due to the inertia thereof so that excessive recording paper is pulled at, whereby the recording paper becomes loose.

This applies also to the carrying of the recording paper in the backward direction. That is to say, also in the carrying of the recording paper in the backward direction, there is the possibility that upon applying a great force to the recording paper, the recording paper will be carried excessively more than necessary in the backward direction due the inertia thereof.

Besides, in the thermal transfer printer of this type, although it goes without saying that the thermal transfer head is pressed against the platen when the recording paper is carried in the forward direction to carry out the thermal transfer printing, the thermal transfer head is released from the platen when the recording paper is carried in the backward direction after the completion of the thermal transfer printing by the ink of one color. And, the thermal transfer head is again pressed against the platen when the carrying of the recording paper in the forward direction is started to carry out the thermal transfer printing by the ink of the next color. However, in the case where the recording paper sags between the thermal transfer head and the platen, whereby the recording paper does not contact the platen, the position of the recording paper relative to the platen is subtly changed every time the thermal transfer head is pressed against the platen. Accordingly, even though the amount of carrying the recording paper is carried in both the forward direction and the backward direction is strictly controlled, the position of the recording paper relative to the platen (the thermal transfer head) is changed every time the thermal transfer head is pressed against the platen at a point of time when the thermal transfer printing by the ink of each color is started, whereby color recording of high quality has been difficult to achieve.

SUMMARY OF THE INVENTION

The present invention has been achieved in view of the above-described circumstances and it is a main object of the present invention to provide a thermal transfer printer capable of carrying a recording paper without the recording paper sagging when it is carried in the forward direction to carry out the thermal transfer printing by the ink of one color and when the recording paper is subsequently carried in the backward direction in order to prepare for the thermal transfer printing by the ink of the next color.

It is a second object of the present invention to provide a thermal transfer printer capable of preventing the recording paper from sagging by applying a braking force to the roll of the recording paper at the time when the recording paper is carried in the forward direction to carry out the thermal transfer printing.

It is a third object of the present invention to provide a thermal transfer printer capable of preventing the recording paper from sagging by rotating the roll of the recording paper in the backward direction when the recording paper is carried in the backward direction after the completion of the thermal transfer printing by the ink of one color so as to wind the recording paper around the roll of the recording paper again.

It is a fourth object of the present invention to provide a thermal transfer printer capable of preventing the recording paper from sagging by imparting a back tension to the recording paper when the recording paper is being carried in the backward direction.

The thermal transfer printer for color printing of the present invention, in which an ink sheet having ink of a plurality of colors disposed sequentially thereon and a recording paper are put one upon another and inserted into a contact part between the thermal transfer head and the platen so as to be subjected alternately to thermal transfer printing with each color while said recording paper is carried in the forward direction and in the backward direction, is provided with a recording paper roll around which the recording paper to be fed is wound up, recording paper roll-supporting means for rotatably supporting said recording paper roll, a recording paper carrying mechanism for carrying the recording paper in the forward direction to draw out the recording paper from said recording paper roll and for carrying the recording paper drawn out from said recording paper roll in the backward direction, and driving means for rotatably driving said recording paper roll-supporting means to rewind the recording paper when the recording paper is carried in the backward direction by means of said recording paper carrying mechanism.

The above and further objects and features of the invention will more fully be apparent from the following detailed description when viewed with the accompanying drawings.

DESCRIPTION OF THE PREFERRED EMBODIMENT

A description of this invention will be made with reference to the drawings showing the preferred embodiments of this invention.

Figure 1:
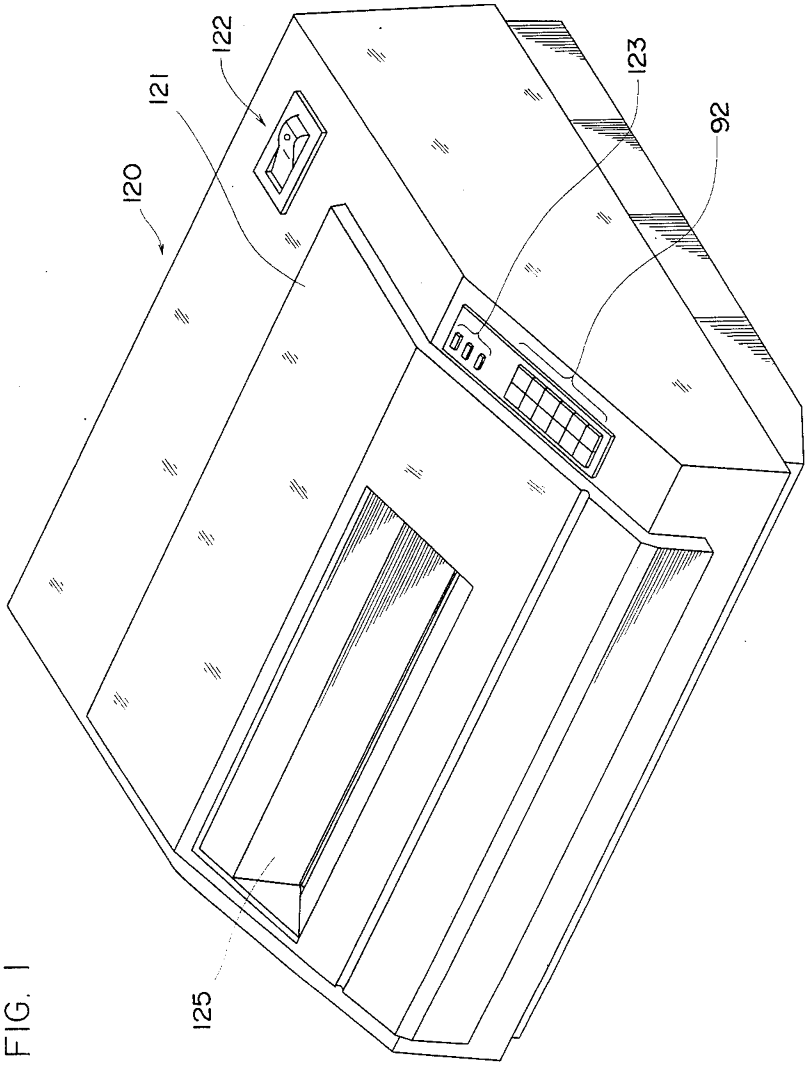
FIG. 1 is a perspective view showing the external appearance of a thermal transfer printer of the present invention.

FIG. 1 is a perspective view showing the appearance of a thermal transfer printer of this invention. Mechanical structural elements of the thermal transfer printer of this invention are contained in a box-like casing 120. The printer is provided with a main switch 122 disposed on the upper rear end of the casing 120, an indication part 123 having various indicators, a key board 92 having various instruction keys disposed on the front right side, and a cover 121 for covering the central portions of the upper front sides. On the upper surface of the cover 121 is an outlet 125 for the printed recording paper.

Figure 2:
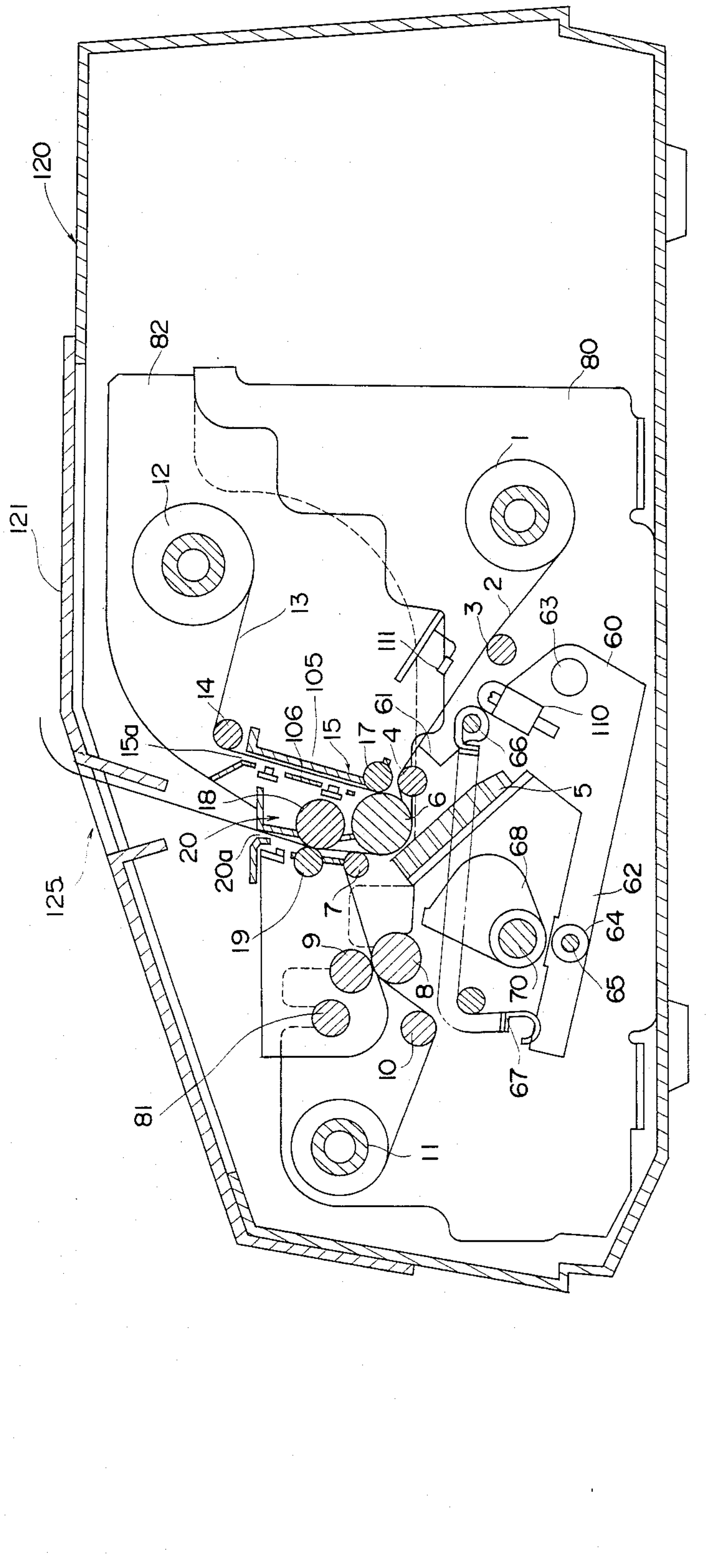
FIG. 2 is a side sectional view showing the internal construction thereof.

FIG. 2 is a sectional side view showing the mechanical structure of the thermal transfer printer of this invention, in a state in which the thermal transfer head 5 and the platen 6 are pressed towards each other.

The main component members of this thermal transfer printer are fixed to a pair of stationary side plates 80 and 80 erected in the casing 120 upright on the right and left sides and extending parallel and also to a pair of movable side plates 82 and 82 lying above the stationary side plates 80 and 80 and extending parallel with each other in the front-to-back direction (the direction of carrying the ink sheet 2 and the recording paper 13 as will be described later), the components being rotatably fixed to the stationary side plates 80 and 80.

Between the stationary side plates 80 and 80 and near the rear ends thereof (the right side in FIG. 2), is a supply roll 1 having the ink sheet 2 wound therearound. At the central parts of the stationary plates 80 and 80, is a bracket 60 having the thermal transfer head 5 fixed thereto. At the front upper parts (the left side in FIG. 2), is a take-up roll 11 for the ink sheet. In a position between the bracket 60 and the take-up roll 11, is an ink sheet carrier roller 8 for carrying the ink sheet 2. And, at the lower central parts of the stationary plates 80 and 80, is a cam supporting shaft 70 fixed to an eccentric cam 68 whose rotational center lies on a pivot of a segment. The printer further comprises a guide shaft 3 for the ink sheet 2 and a first head guide shaft 4 between the ink sheet supply roll 1 and the platen 6, a second head guide shaft 7 between the platen 6 and the ink sheet carrier roller 8, and a guide shaft 10 between the ink sheet carrier roller 8 and the take-up roll 11.

The rotational speed of the ink sheet carrier roller 8 for carrying the ink sheet 2 is synchronized with the carrying speed for the recording paper 13 as will be described later.

The movable side plates 82 and 82 are bearingly supported at one end thereof about an axis 81 of rotation provided on the front upper parts of the aforesaid stationary side plates 80 and 80 and permit the platen 6 and the thermal transfer head 5 to be pressed towards each other with the other ends thereof turned backward as a normal state for use. In other words, the movable side plates 82 and 82, when put into a state of use, are provided with: a recording paper roll 12 having the recording paper 13 wound therearound, disposed near the rear ends of the side plates (near the other ends of the casing 120), a slit-like sheet-inserting passage 15 formed by guide plates 105 and 106 depending almost vertically from the guide shaft 14 in the middle portion of a space interposed between the movable side plates 82 and 82, an upwardly directed recording paper discharging passage 20 formed by the second paper carrier roller 18 and the second pressing roller 19 facing each other so that the discharging passage is roughly parallel with the recording paper inserting passage 15, a platen 6 in the form of a roller further serving as a first recording paper carrier roller disposed between the lower end parts of the inserting passage 15 and of the discharging passage 20, as well as a first pressing roller 17, and another pressing roller 9 disposed slightly behind the axis of rotation 81 lying on the front side.

A pressing position at which the fist pressing roller 17 is pressed against the platen 6 serving as the first carrier roller lies on the upstream side along the carrying direction for the recording paper past a contact position produced when the thermal transfer head 5 is pressed to the platen 6 (also a position disposed along a line of heating elements of the thermal transfer head 5). Therefore, an acting position at which a carrying force is exerted by the platen 6 as the first recording paper carrier roller upon the recording paper lies on the upstream side along the carrying direction for the recording paper 13 past a pressing position of the thermal transfer head 5 and the platen 6.

The upper end of the inserting passage 15 and that of the discharging passage 20 lead to an inlet opening 15*a* for the recording paper 13 undergoing a change in the running direction thereof at the guide shaft 14 and to an outlet 20*a* for discharging the recording paper 13 toward a discharging opening 125 of the cover 121 of the casing 120, respectively.

A positional relation between parts to be arranged when the printer is in use (a state as shown in FIG. 2) is fixed so that the pressing roller 9 and the ink sheet carrier roller 8 on the side of the stationary side plates 80 and 80 are pressed to each other as well as the platen 6 as the first recording paper carrier roller and the thermal transfer head 5 on the side of the stationary side plates 80 and 80 are likewised pressed.

A color sensor 111 is fixed to the movable side plates 82 and 82 at positions located a little toward the other ends of the plates. Furthermore, a light source 110 for the color sensor 111 is fixed at a position on the plate brackets 60 and 60 that opposes the color sensor 111 with the carrying passage for the ink sheet 2 interposed therebetween.

Figure 3:
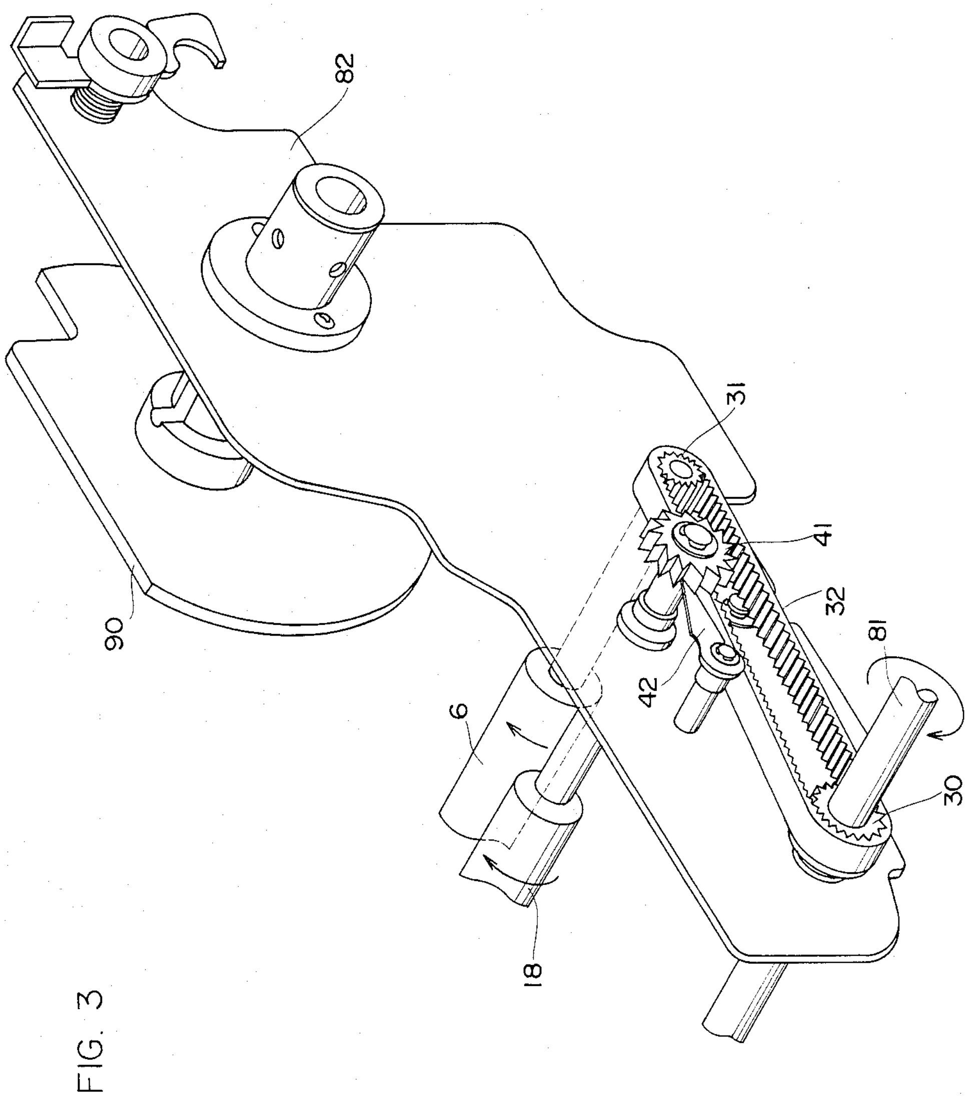
FIG. 3 is a perspective view from a right side for showing main parts of a carrying mechanism for a recording paper.

When the movable side plates 82 and 82 are turned counterclockwise around a shaft 81 with the cover 121 removed as shown in FIG. 3 to be put into an open state, the ink sheet supply roll 1 and the ink sheet 2 are exposed to a wide open space above the casing 120 and the ink sheet supply roll 1 is readily exchanged.

A pair of plate brackets 60 and 60 disposed right and left for supporting the thermal transfer head 5 are rotatably supported by a shaft 63 positioned near the stationary side plates 80 and 80 and extend parallel with each other between the side plates 80 and 80. Furthermore, both plate brackets 60 and 60 are part of one body comprising a a structure that includes the thermal transfer head 5, first head guide shaft 4, second head guide shaft 7 and a cam pressing shaft 65 provided with a cam pressing roller 64 as a cam follower fixed therebetween.

Both plate brackets 60 and 60 are biased rearwardly upwardly (clockwise on the FIG. 2) at the front end portion thereof to turn around the shaft 63 by tensions exerted by springs 67 and 67 employed as biasing members stretched between the front end portions and a shaft 66 fixed to both stationary side plates 80 and 80.

The respective positions of parts fixed between the plate brackets 60 and 60 are set in such manner that, when the platen 6 and the thermal transfer head 5 are pressed to each other, the first and the second head guide shafts 4, 7 are disposed before and behind the platen 6, respectively.

A pressing roller 64 on the cam pressing shaft 65 faces the cam surface of the eccentric cam 68 fixed to the aforesaid cam supporting shaft 70.

With the platen 6 pressed to the thermal transfer head 5, the cam surface of the eccentric cam 68 is brought into contact with the cam pressing roller 64 when the cam 68 is rotated about the cam supporting shaft 70, and the cam pressing shaft 65 is thus depressed lower so that the plate brackets 60 and 60 are turned downward together at the front ends thereof in opposition to stretching force of the spring 67. Thus, the thermal transfer head 5 is released from the platen 6.

The plate brackets 60 and 60 are also provided with the light source 110 for the color sensor 111 for sensing the colors of ink of the ink sheet 2.

Figure 4:
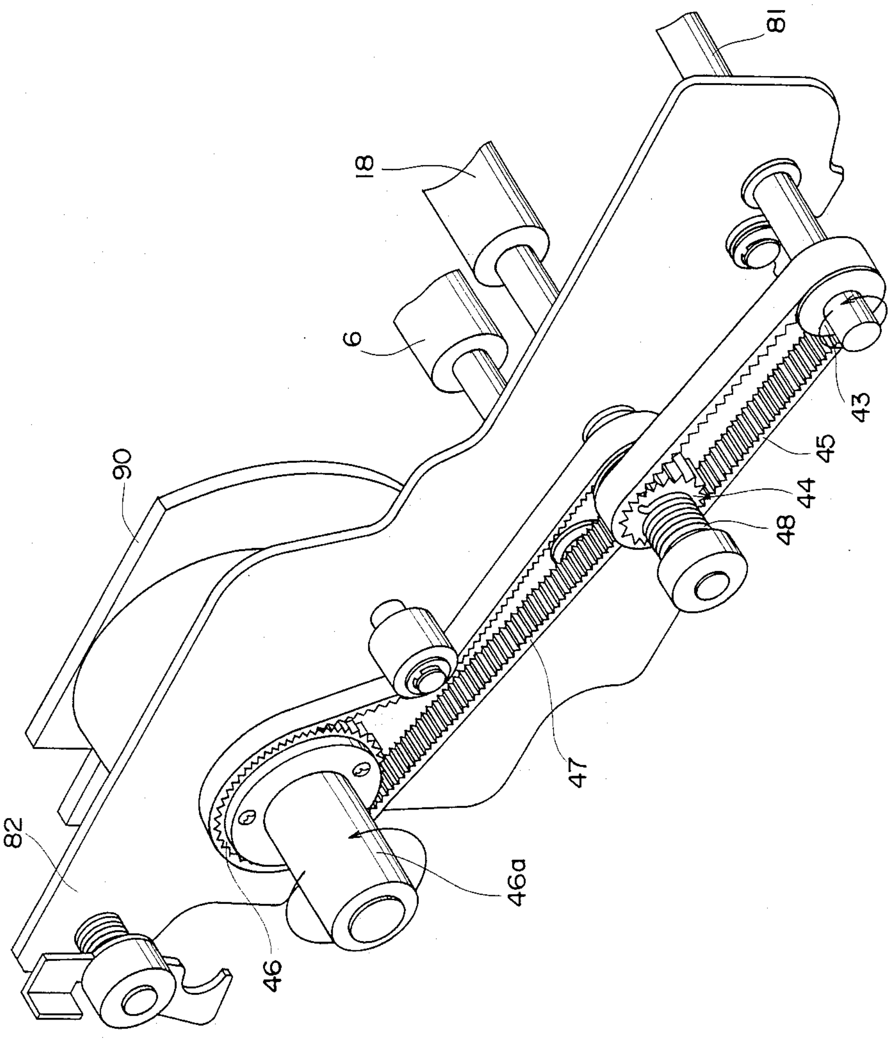
FIG. 4 is a perspective view from a left side of the same.

FIGS. 3, 4 are perspective views showing a construction of main parts of a recording paper-carrying mechanism, in which FIG. 3 shows the external appearance of a right-hand movable side plate 82, as viewed from the front thereof, of a thermal transfer printer of the present invention while FIG. 4 shows the external appearance of a left-hand movable side plate 82, as viewed from the front thereof, of the thermal transfer printer of the present invention.

At first referring to FIG. 3, as described above, the shaft 81, which is the center of rotation of the movable side plate 82, is provided with a spur gear 30 fixedly mounted thereon outside the right-hand movable side plate 82 and this shaft 81 is adapted to be rotatably driven by means of a motor (not shown).

One end portion of the rotation axis of the platen 6 projects through the right-hand movable side plate 82 at a portion closer to a lower side of a central portion of the right-hand movable side plate 82, a spur gear 31 being fixedly mounted on this projected portion. And, a cogged belt 32 extends between the spur gear 30 and the spur gear 31.

Upon rotating the shaft 81 about its rotation axis in a clockwise (or counterclockwise) direction as shown by an arrow in FIG. 3, a rotational driving force of the shaft 81 is transmitted to the spur gear 31 through the cogged belt 32, so that the platen 6 is rotated clockwise (or counterclockwise). In this case, the recording paper 13 is drawn out from the recording paper roll 12 and carried in the forward direction (or the backward direction).

A portion projecting through the right-hand movable side plate 82 of the second recording paper-carrier roller 18 (detailly described in the description referring to FIG. 4 but rotationally driven in the same direction as the shaft 81 and the platen 6) is provided with a ratchet wheel 41 fixedly mounted thereon. And, the right-hand movable side plate 82 is provided with a ratchet pawl 42 for prohibiting the rotation of this ratchet wheel 41 in a counterclockwise direction as seen in FIG. 3 (the recording paper 13 is carried in the backward direction toward the recording paper roll 12) to allow the ratchet wheel 41 to rotate only in a clockwise direction.

In addition, reference numeral 90 in FIG. 3 designates a right-hand recording paper roll-supporting reel plate as a supporting means of the recording paper roll 12.

On the other hand, FIG. 4 shows the external appearance of the left-hand movable side plate 82.

A portion projecting through the left-hand movable side plate 82 of the shaft 81 is provided with a spur gear 43 fixedly mounted thereon. In addition, a portion projecting through the left-hand movable side plate 82 of the second recording paper-carrier roller 18 is provided with an idle gear (not shown in FIG. 4) disposed between an idle gear 44 and the movable side plate 82. Furthermore, the left-hand movable side plate 82 is provided with a left-hand recording paper roll-supporting reel plate 90 mounted thereon at a position corresponding to that of the right-hand recording paper roll-supporting reel plate 90 mounted on the right-hand movable side plate 82, a spur gear 46 being fixedly mounted to the left-hand recording paper roll-supporting reel plate 90.

And, a cogged belt 45 extend between the spur gear 43 and the idle gear 44 while a cogged belt 47 extends between an idle gear arranged inside the idle gear 44 and the spur gear 46.

A spring clutch 48 is mounted on an outside portion of the idle gear 44 of the recording paper-carrier roller 18 which is the second recording paper-carrier roller so that the rotational driving force of the idle gear 44 may be transmitted to the second recording paper-carrier roller 18 in only one direction i.e. one in which shaft 81 is rotated counterclockwise as seen in FIG. 4, whereby the idle gear 44 is rotationally driven in the same direction, when the recording paper 13 is carried in the forward direction.

Furthermore, the gear ratio of the gears is selected so that a rotational speed of the recording paper-carrier roller 18 is slightly larger than that of aforesaid platen 6 as the first recording paper-carrier roller.

Figure 5:
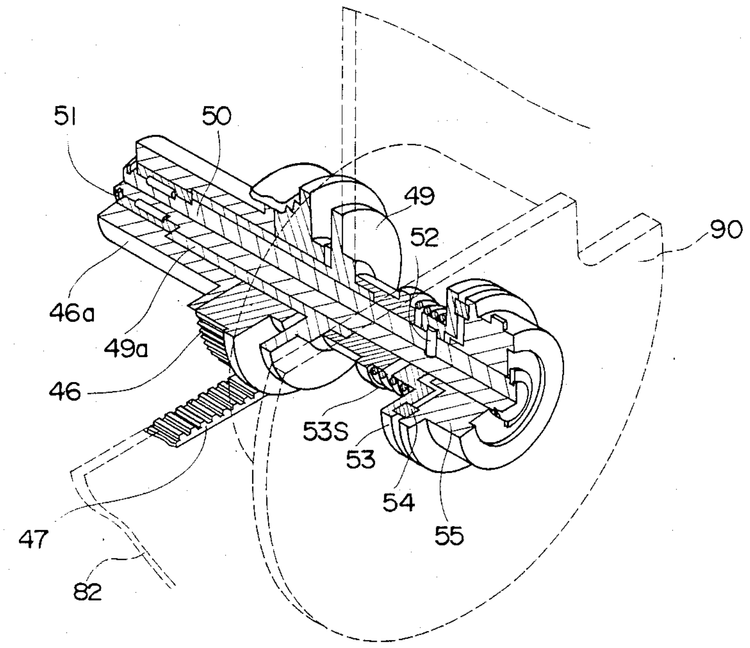
FIG. 5 is a perspective view showing the main parts shown in FIG. 4.
Figure 6:
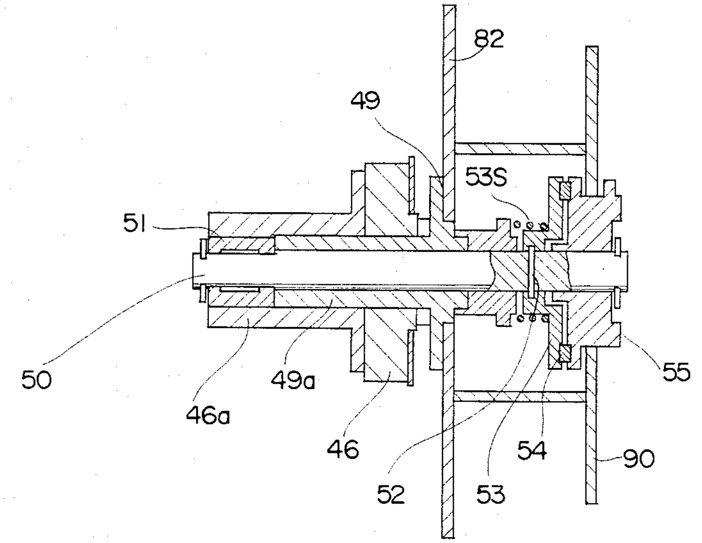
FIG. 6 is a longitudinal sectional view showing the main parts shown in FIG. 4.

FIGS. 5, 6 are a partially broken away perspective view as viewed from a right side and a longitudinal sectional view as view from the front, respectively, showing a construction the left-hand recording paper roll-supporting reel plate 90 and the spur gear 46 mounted on the left-hand recording paper roll-supporting reel plate 90.

The spur gear 46 is integrally provided with a sleeve 46*a* mounted on a hollow rotation axis 49*a* thereof. On the other hand, a shaft 50 extends through a fixed sleeve 49 mounted on the left-hand movable side plate 82 and projects outside through the left-hand movable side plate 82. And, the sleeve 46*a* is connected with the shaft 50 through a one-way clutch 51. This one-way clutch 51 is adapted to transmit only the rotation of the sleeve 45*a* (in short, the spur gear 46) in a clockwise direction as seen in FIG. 4 (the rotation in a counterclockwise direction as seen in FIGS. 2, 3, that is to say the carrying of the recording paper 13 in the backward direction) to the shaft 50.

A reel 53 locked to the shaft 50 by means of a lock pin 52 is mounted inside of the left-hand movable side plate 82. A supporting reel 55 is idly mounted to the shaft 50 inside the reel 53 while a friction ring 54 made of rubber is located between the reel 53 and the supporting reel 56. And, the reel 53 is pressed toward the supporting reel 56 by means of a coil spring 53S arranged outside the reel 53, that is to say at a side of the left-hand movable side plate 82.

Accordingly, a rotational driving force of the spur gear 46 is transmitted to the supporting reel 55 through the one-way clutch 51, the shaft 50, the reel 53 and the friction ring 54 only in the case where the spur gear 46 is rotated in a clockwise direction as seen in FIG. 4 (a counterclockwise direction as seen in FIGS. 2, 3) when the recording paper is carried in the backward direction, whereby the recording paper 13 is rewound around the recording paper roll 12. At this time, in the case where a resisting force is exerted on the supporting reel 55, the friction ring 54 allows the supporting reel 55 to suitably slide so that the exerting of an excessive force is avoided.

The driving operation and carrying operation of the recording paper roll 12 and the recording paper 13 in the thermal transfer printer of the present invention constructed in the above-described manner will be described below. In the following description, the rotating direction of the recording paper roll 12, the platen 6 which is the first recording paper-carrier roller, the recording paper-carrier roller 18 which is the second recording paper-carrier roller, and the shaft 81 is as shown in FIGS. 2, 3.

At first, the recording paper roll 12 is installed between a pair of recording paper roll-supporting reel plates 90, 90 so that one end thereof may be engaged with the supporting reel 55, and then the recording paper 13 is drawn out from the recording paper roll 12 by a user inserting a front end thereof into the inserting port 15*a*. Upon switching an appointed switch on, the recording paper 13 is discharged form the outlet 20*a* through an appointed course.

Under this condition, upon the shaft 81 clockwise by means of a motor (not shown), the platen 6, which is the first recording paper-carrying roller, and the recording paper-carrier roller 18, which is the second recording paper-carrier roller, are rotated clockwise. Accordingly, the recording paper 13 is drawn out from the recording paper roll 12 to be carried in the forward direction.

At this time, upon carrying the ink sheet 2 in the same direction as the recording paper 13 by rotating the carrying roller 8 and the take-up roll 11 of the ink sheet 2 and simultaneously selectively heating and driving the thermal head 5, one ink of the ink sheet 2 is thermally transferred onto the recording paper 13.

At this time, as described above, the rotational speed of the recording paper-carrier roller 18 is set so as to be slightly (for example about 0.8%) larger than that of the platen 6. Accordingly, the recording paper 13 is always drawn by the recording paper-carrier roller 18 from a position where the platen 6 faces the pressing roller 17. In other words, a back tension is imparted by the recording paper 13 to the recording paper-carrier roller 18 side from a contact part between the platen 6 and the pressing roller 17 via the thermal head 5. Accordingly, the recording paper 13 hardly sags between the platen 6 and the recording paper-carrier roller 18, more concretely at the contact part between the platen 6 and the thermal head 5.

Subsequently, the recording paper 13 is carried in the backward direction to thermally transfer ink of another color coated on the ink sheet 2.

In this case, at first the eccentric cam 68 is driven to separate the thermal transfer head 5 from the platen 6.

Under this condition, upon the shaft 81 counterclockwise, both the platen 6 and the recording paper roll 12 are rotated counterclockwise. Accordingly, the recording paper 13 is rewound around the recording paper roll 12 while being carried by the platen 6 in the backward direction. When the recording paper 13 is rewound around the recording paper roll 12, the recording paper-carrying roller 18 is prevented from being rotated counterclockwise by means of the ratchet wheel 41 and the ratchet pawl 42, as shown in FIG. 3, so that the recording paper 13 reaches a condition of being tensioned by the recording paper-carrier roller 18 and the second pressing roller 19. Thus, the recording paper 13 is rewound around the recording paper roll 12 under the condition that a suitable back tension is given thereto, whereby the recording paper 13 does not sag. Also in the case where a large resisting force is exerted on the recording paper 13 being rewound, the supporting reel 55, that is to say the recording paper roll 12, is adapted to slip against a rotating force given by a motor (not shown) by the action of the friction ring 54 as shown in FIG. 5, so that the recording paper 13 can be normally rewound without being broken.

Thus, upon completion of the rewinding of the recording paper 13, the ink sheet 2 is drawn out again from the recording paper roll 12 to be carried in the forward direction in the same manner as described above whereby the ink of the next color coated on the ink sheet 2 is thermally transferred onto the recording paper 13.

Figure 8:
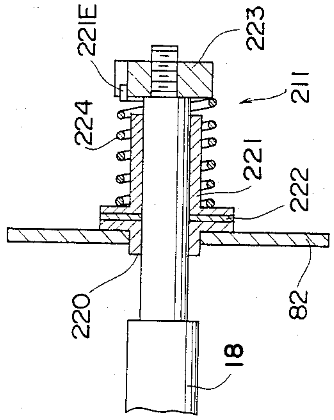
FIG. 8 is a longitudinal sectional view showing the main parts thereof.
Figure 7:
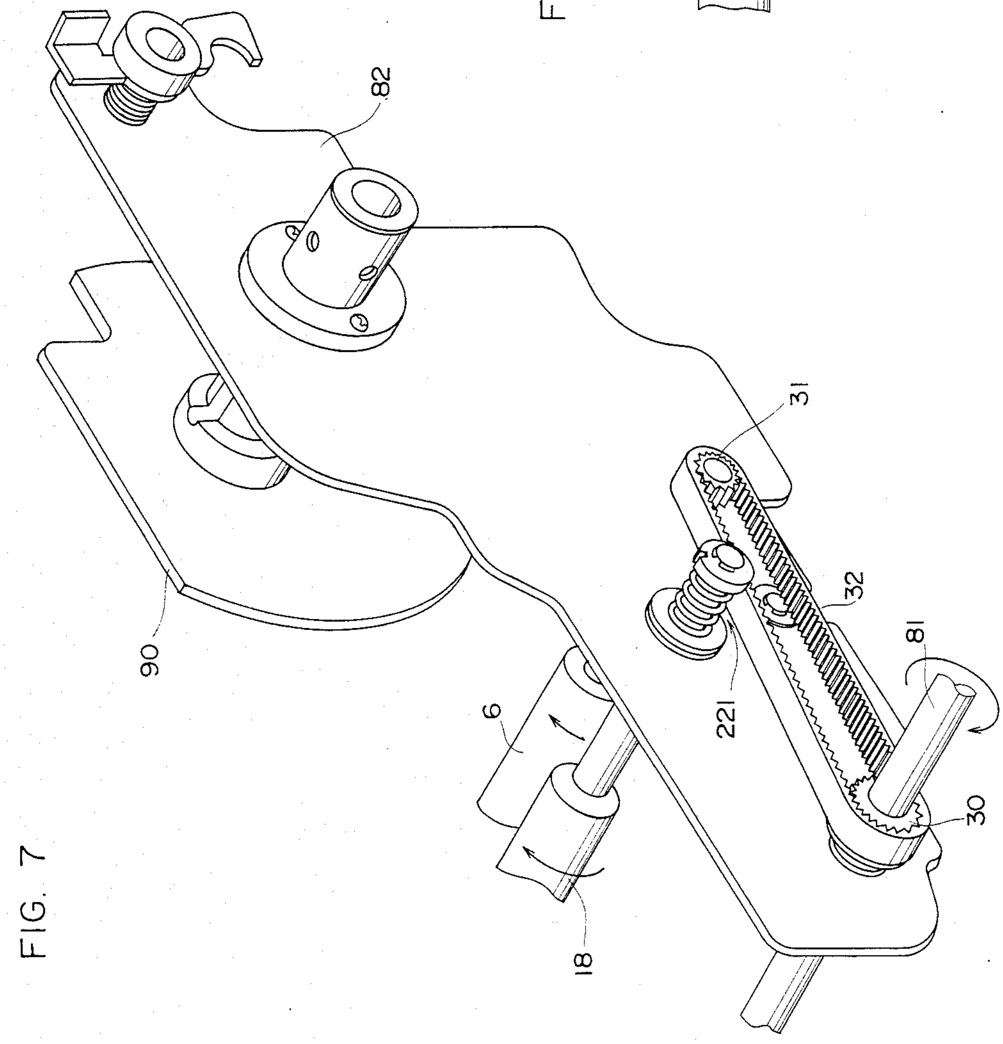
FIG. 7 is a perspective view from a right side showing main parts of a carrying mechanism for the recording paper of another embodiment, of the present invention

Another embodiment of the present invention is shown in FIGS. 7, 8, in which FIG. 7 is a perspective view (corresponding to FIG. 3) showing main parts of a recording paper carrying mechanism as viewed from the right while FIG. 8 is a longitudinal sectional view showing the main parts as viewed from the front.

In this embodiment, a sliding clutch 211 is provided in place of the ratchet wheel 41 in the above described embodiment.

The concrete construction is as follows:

A shaft of a recording paper-carrier roller 18 which is a second recording paper-carrier roller, is inserted into a bearing 220 fixedly mounted on a right-hand movable side plate 82. A friction sheet 222 is idly mounted on the shaft of the recording paper-carrier roller 18 outside the movable side plate 82 and a cylindrical body 221 provided with a flange on the movable side plate 82 side is idly mounted on the shaft of the recording paper-carrier roller 18 outside the friction sheet 222.

On the other hand, a screw is threaded on an outside end portion of the shaft of the recording paper-carrier roller 18, a nut 223 being screwed on said threaded portion. And, a suitably compressed coil spring 224 abuts the periphery of the cylindrical body 221 and extends between the flange of the cylindrical body 221 and the nut 223. In addition, the coil spring 221 is fixedly mounted on the nut 223 at an end portion of the nut 223 side thereof so as to always maintain the same positional relation relative to the nut 223.

Accordingly, in the case where the recording paper-carrier roller 18 is rotated clockwise as seen on FIG. 7 (seen as on FIGS. 2, 3), the nut 223 is rotated in such a direction that it moves away from the shaft of the recording paper-carrier roller 18. Thus, the coil spring 224 loosens due to the rotation of the nut 223, so that the second recording paper-carrier roller 18 is freely rotated.

On the other hand, in the case where the recording paper-carrier roller 18 is rotated counterclockwise as seen on FIG. 7 (in the carrying of the recording paper 13 in the backward direction), the nut 223 is rotated in such a direction that it is screwed toward the shaft of the recording paper-carrier roller 18. Thus, the coil spring 224 is compressed due to the rotation of the nut 223 to fasten the cylindrical body 221, so that a frictional force of the friction sheet 222 is transmitted to the shaft of the recording paper-carrier roller 18 through the cylindrical body 221 and the coil spring 224. Consequently, when the recording paper 13 is carried in the backward direction, the recording paper-carrier roller 18 is rotated while being subjected to a frictional brake action, so that a back tension is given to the recording paper.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A thermal transfer printer for printing by thermally transferring ink from an ink sheet on which a plurality of colored inks are sequentially disposed onto recording paper which is repeatedly moved in a forward direction during which one of the colored inks is thermally transferred thereto and in a backward direction opposite to the forward direction before a subsequent one of the sequentially disposed colored inks is thermally transferred thereto, said printer comprising:
   - a roll of the recording paper, and a recording paper roll-supporting means for rotatably supporting the roll of the recording paper;
   - a thermal transfer head and a platen between which the ink sheet and the recording paper drawn from the roll thereof extend during the thermal printing, said thermal transfer head for thermally transferring the colored inks from the ink sheet to the recording paper when the thermal transfer head contacts the platen at a contact point;
   - a recording paper carrying mechanism for drawing the recording paper from the roll thereof supported on the recording paper roll-supporting means past said thermal head and said platen in the forward direction and for moving the recording paper drawn out from the roll thereof in the backward direction; and
   - drive means including means operatively connected to the recording paper roll-supporting means for rotatably driving the recording paper roll-supporting means in a rotational direction in which the recording paper drawn from the roll is rewound thereon while the recording paper is moved in the backward direction by the recording paper carrying mechanism to prevent the recording paper from sagging when moved in the backward direction.

2. A thermal transfer printer as claimed in claim 1, and further comprising brake means operatively connected to said recording paper roll-supporting means for braking rotation of the roll of the recording paper supported thereby when the recording paper is drawn out therefrom.

3. A thermal transfer printer as claimed in claim 2, wherein said brake means comprises a friction member for transmitting a drive force exerted by the drive means to said recording paper roll-supporting means while the recording paper is moved by said recording paper carrying mechanism in the backward direction and for exerting a frictional braking force on said recording paper roll-supporting means when the recording paper is moved in the forward direction with the ink sheet to back tension the recording paper when moved in the forward direction.

4. A thermal transfer printer as claimed in claim 3, wherein said friction member is a rubber ring.

5. A thermal transfer printer as claimed in claim 2, and further comprising a one-way clutch operatively connected between the drive means and the recording paper roll-supporting means for transmitting a driving force exerted by the drive means to the recording paper roll-supporting means only when the driving force is one that rotates said roll-supporting means in said rotational direction thereof.

6. A thermal transfer printer as claimed in claim 5, wherein said one-way clutch is a spring clutch.

7. A thermal transfer printer as claimed in claim 1, wherein said recording paper carrying mechanism comprises a first recording paper-carrier roller for exerting a carrying force on the recording paper upstream of the contact point for moving the recording paper in both the forward and the backward directions when rotated in first and second rotational directions, respectively, a second recording paper-carrier roller for exerting a carrying force on the recording paper downstream of said contact point for moving the recording paper in the forward direction and for imparting back tension on the recording paper when the recording paper is moved in the backward direction, and a pressing roller in pressing engagement with said second ˋpaper-carrier roller with the recording paper extending therebetween, said pressing roller being driven by said second paper-carrier roller.

8. A thermal transfer printer as claimed in claim 7, wherein said drive means includes means for driving said first recording paper-carrier roller in said first and second rotational directions thereof, and further comprising a one-way clutch operatively connected between said means for driving said first paper-carrier roller and said second recording paper-carrier roller for engaging said second paper-carrier roller only when said means for driving said first paper-carrier roller drives said first paper-carrier roller in said first rotational direction thereof.

9. A thermal transfer printer as claimed in claim 7, p1 and further comprising means for prohibiting said second paper carrier from rotating when said recording paper is moved in the backward direction to impart back tension to the recording paper carried in pressing engagement between said second recording paper-carrier roller and said pressing roller when the recording paper is moved in the backward direction.

10. A thermal transfer printer as claimed in claim 9, wherein said means for prohibiting comprises a ratchet connected to said second recording paper-carrier roller so as to be rotated therewith, and a pawl engaging said ratchet.

11. A thermal transfer printer as claimed in claim 7, and further comprising a braking mechanism operatively connected to said second recording paper-carrier roller for braking the rotation thereof when the recording paper is moved in the backward direction to impart back tension to the recording paper carried in pressing engagement between said second recording paper-carrier roller and said pressing roller when the recording paper is moved in the backward direction.

12. A thermal transfer printer as claimed in claim 11, wherein said braking mechanism is a sliding clutch.

13. A thermal transfer printer as claimed in claim 7, wherein said first recording paper-carrier roller is said platen.

14. A thermal transfer printer for printing by thermally transferring ink from an ink sheet on which a plurality of colored inks are sequentially disposed onto recording paper which is repeatedly moved in a forward direction during which one of the colored inks is thermally transferred thereto and in a backward direction opposite to the forward direction before a subsequent one of the sequentially disposed colored inks is thermally transferred thereto, said printer comprising:

a roll of the recording paper, and a recording paper roll-supporting means for rotatably supporting the roll of recording paper;

a thermal transfer head and a platen between which the ink sheet and the recording paper drawn from the roll thereof extend during the thermal printing, said thermal transfer head for thermally transferring the colored inks from the ink sheet to the recording paper when the thermal transfer head contacts the platen at a contact point;

a recording paper carrying mechanism for drawing the recording paper from the roll thereof supported on the recording paper roll-supporting means past said thermal head and said platen in the forward direction and for moving the recording paper drawn out from the roll thereof in the backward direction, said recording paper carrying mechanism including a first recording paper-carrier roller for exerting a carrying force on the recording paper upstream of the contact point for moving the recording paper in both the forward and the backward directions when rotated inn first and second rotational directions, respectively, and a second recording paper-carrier roller for exerting a carrying force on the recording paper downstream of said contact point for moving the recording paper in the forward direction and for imparting back tension on the recording paper when the recording paper is moved in the backward direction; and drive means including means for rotatably driving the recording paper roll-supporting means in a rotational direction in which the recording paper drawn from the roll is rewound thereon while the recording paper is moved in the backward direction by the recording paper carrying mechanism.

15. A thermal printer as claimed in claim 14, wherein said drive means includes means for rotating the first recording paper carrier-roller at a first rotational speed and for rotating the second recording paper carrier-roller at a second rotational speed, said second rotational speed being greater than said first rotational speed.

* * * * *